Feb. 9, 1932.  F. SHORT  1,844,186
AIRPLANE LANDING GEAR
Filed May 24, 1928  2 Sheets-Sheet 1

INVENTOR
Frank Short
BY Robert H. Young
ATTORNEY

Feb. 9, 1932.   F. SHORT   1,844,186
AIRPLANE LANDING GEAR
Filed May 24, 1928   2 Sheets-Sheet 2
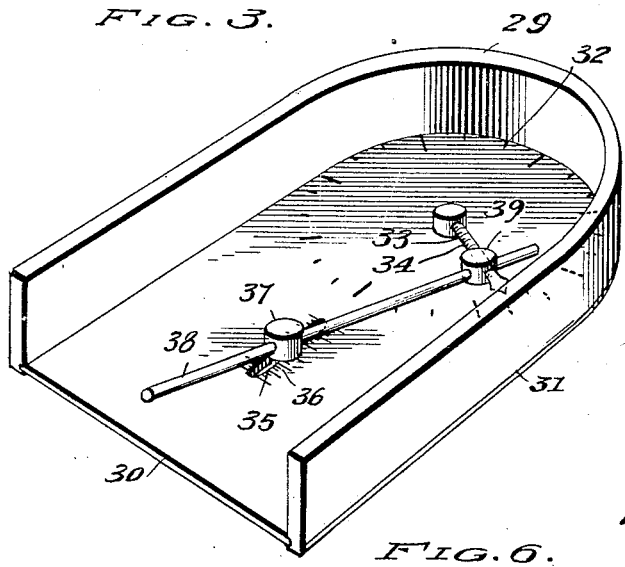
FIG. 3.
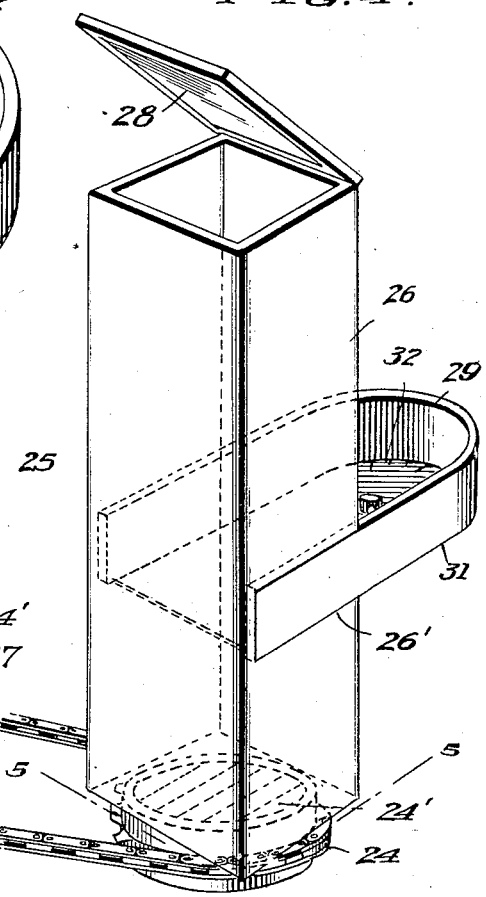
FIG. 4.
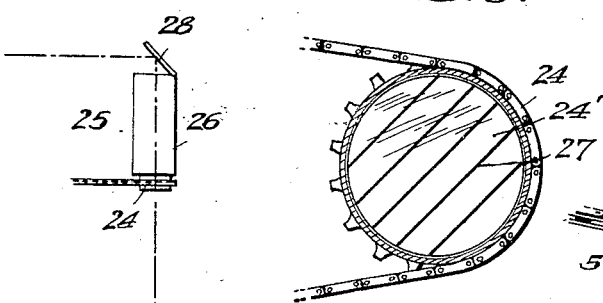
FIG. 6.
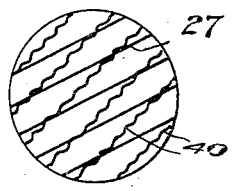
FIG. 7.
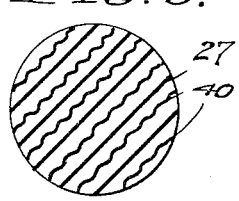
FIG. 8.
FIG. 9.
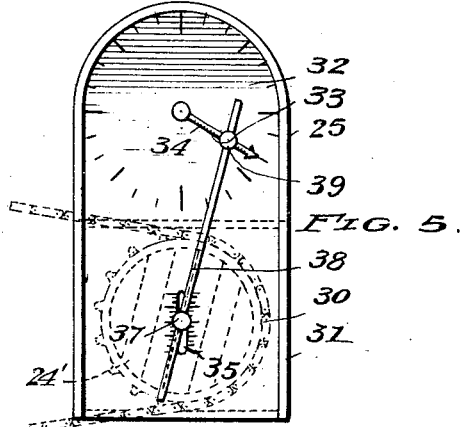
FIG. 5.
INVENTOR
Frank Short
BY Robert H. Young
ATTORNEY Patented Feb. 9, 1932

1,844,186

UNITED STATES PATENT OFFICE

FRANK SHORT, OF POUGHKEEPSIE, NEW YORK

AIRPLANE LANDING GEAR

Application filed May 24, 1928. Serial No. 280,245.

This invention relates to airplanes, and has for its object to provide improvements in landing gear therefor.

A specific object of the invention is to provide a landing gear having pivotally mounted wheels, or their equivalents, skids or pontoons, so arranged that an airplane may successively take off or land across the direction of the wind.

A further object of the invention is to provide a landing gear having pivotally mounted wheels or their equivalents arranged to be controlled by the pilot of the airplane so that narrow stretches of terrain such as improved roads, and narrow bodies of water, such as canals, etc., may be used for taking off or landing, thereby reducing the hazards and inconveniences of forced or emergency landings, and widening the field of localities available for airports.

With these and other objects in view the invention consists of the novel construction of the landing gear, and the devices for indicating the proper setting or orientation of the pivotally mounted wheels, skids or pontoons.

The invention also consists of certain other novel details of construction and combinations of parts, all of which will be first fully described and afterwards specifically pointed out in the appended claims.

Referring to the accompanying drawings.

Fig. 3 is a perspective view of the drift indicator attachment.

Fig. 4 is a perspective view of the drift indicator.

Fig. 5 is a plan view of the drift indicator attachment.

Fig. 6 is horizontal sectional view through the indicator taken on line 5—5 of Fig. 4.

Fig. 7 is a diagrammatic view illustrating the indicator improperly set.

Fig. 8 is a similar view illustrating a proper setting, and

Fig. 9 is a diagrammatic view of the same in side elevation.

Figure 1:
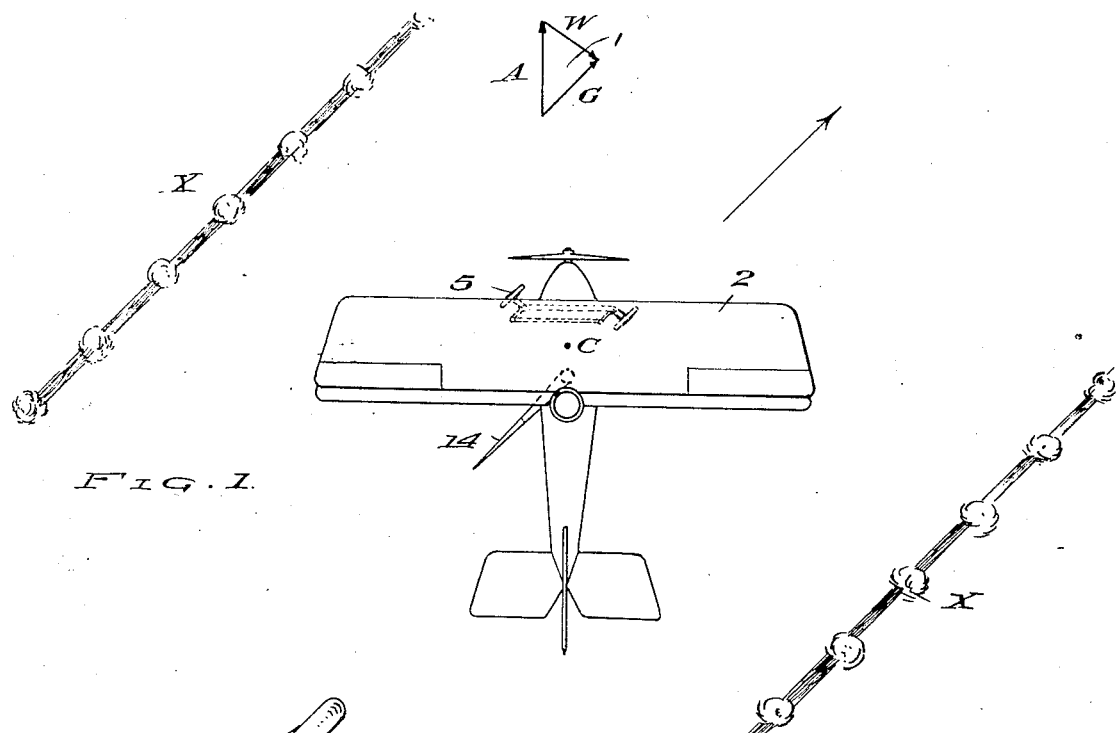
Fig. 1 is a diagrammatic view of an airplane in the act of taking off or landing in a restricted enclosure lying across the wind, and diagrammatically illustrating the direction of the three velocities indicated by vectors A, W and G.
Figure 2:
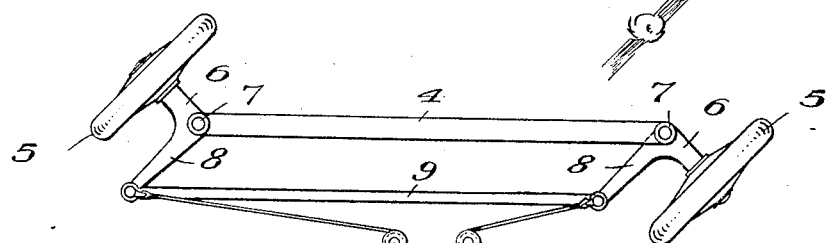
Fig. 2 is a diagrammatic view of the landing gear and its associated mechanism.

Like numerals of reference indicate the same parts throughout the several figures of the drawings, in which it will be seen that I have illustrated the landing gear as being equipped with wheels, though it is to be understood that I propose the substitution of skids or pontoons to meet the requirements of planes requiring such devices.

In the accompanying drawings, 1 indicates a diagram of the three velocities present, in which vector A is the air speed and is the direction in which the airplane is pointed; vector W is the wind speed and is the direction of the cross wind, and vector G is the resultant of the two and indicates the ground speed and is the direction the airplane is actually following in flight, and is also the direction which the plane should follow on the ground both in taking off and landing. These three vectors A, W, and G may therefore be termed "air speed", "wind speed" and "ground speed".

It will be entirely evident to those skilled in the art that an aviator may frequently find a suitable long landing area lying in the direction of vector G, but that a cross wind represented by vector W makes it hazardous if not impossible to point his plane along the direction of vector G, without being blown laterally in the direction of vector W at the same time. Further reference to such conditions will therefore not be necessary to a complete understanding of this invention in the light of the following description.

The airplane 2 is supplied with a landing gear 3 including an axle 4 having wheels 5 mounted on stub shafts 6 pivotally connected to the axle 4 by pivotal connections 7.

Connecting the arms 8 to the stub shafts 6 is a reach rod 9, and to said arms, are also connected the cables 10, which lead over idler pulleys 11, and thence to and around a drum 12 which rotates around a pivot 13 and controls the orientation of a skid 14. By suitably shaping and proportioning of the drum 12 and arms 8, the wheels 5 and skid 14 are simultaneously moved and maintained in proper angular relation with each other.

When conditions require, I contemplate the use of a third wheel 15, which may be pivoted in any suitable manner, as by a mounting 16 and its pivot 17 in connection with a drum 18 similar to drum 12 and connected therewith by a cable 19 so that all wheels will be moved in parallelism.

To actuate the whole system, a drum or sprocket 20 is fixed to the drum 12, and connected by a cable or chain 21 to a drum or sprocket 22, also passing over the drum or sprocket 24 of the drift indicator 25, and a hand wheel 22' is provided for manual control and operation.

The skid 14 is positioned at or near the center of gravity indicated at C in Fig. 1, so that when the same is orientated its contact with the ground is approximately behind the center of gravity of the airplane when considering the "ground speed" direction. The dragging resistance applied by this skid 14 for stopping the run of the airplane after landing is thus applied so that the total rolling resistance of the airplane on the ground will be sufficiently near the line of application of the momentum of the mass which it helps to overcome, that the rudder or other steering device may direct and maintain the proper course on the ground and avoid any unduly sharp turns or "ground loops", although in certain types of airplanes, skid 14 may profitably be omittted entirely.

For avoiding air resistance while in flight, this skid may be retracted against or within the fuselage of the plane in any suitable manner.

To indicate to the pilot whether the wheels, skids, or pontoons are properly oriented along the direction of vector G, which is the direction in which the airplane must roll or move on taking off or landing, I provide the drift indicator 25 shown in Figs. 3 to 9.

This device includes a casing 26 disposed vertically above the drum or sprocket 24, which drum or sprocket is provided with a transparent surface 24' having thereon a plurality of parallel lines 27, as shown in Figs. 7 and 8. At the top of said casing 26, is a reflecting mirror 28 in the line of vision of the pilot, so that the said parallel lines 27 as well as the ground are reflected in the said mirror 28. These parallel lines 27 being in the wheel-orienting system, are moved therewith so that they at all times lie in the direction of and parallel with the wheels 5.

Removably disposed in a slot 26' in the drift indicator casing 26, is a drift indicator attachment 29, which includes a transparent bottom 30 fixed to a frame 31, said transparent bottom 30 having a graduated dial 32, within which is centrally pivoted the wind arm 33 calibrated at 34 in miles per hour.

Disposed in line in rear of the center of the dial 32 is a slot 35, calibrated at 36 for air speed of the airplane.

Movably fixed in said slot 35 is a stud 37, slidably carrying the drift direction rod 38 which is also slidably mounted on the calibrated wind arm 33.

Having thus described the invention, its operation is as follows:

In Fig. 1, a restricted landing area is defined by impedimenta diagrammatically indicated by the letter X, and it is necessary to take off from said area under the conditions of wind direction indicated by vector W. The wind arm 33, (Fig. 3) is turned on the dial 32 to agree with the wind direction. The velocity of the wind being determined or calculated in any suitable manner, the swivelling element 39 is set on the calibrated wind arm 33 in agreement with such wind velocity. The stud 37 is then moved in the calibrated slot 35 to agree with air speed of the plane when about to take off. The result of these settings is indicated by the drift rod 38, which establishes the direction of the vector G which is the ground speed and is the direction the plane must pass over the ground in taking off. It will be seen from Fig. 1 that the direction of the vector G is shown parallel with the impedimenta X, while the airplane is pointing in the direction of the "air speed" vector A and in a direction obliquely across the said area.

The direction of the vector G having been established by the drift rod 38, the wheels, skids, or pontoons are orientated until the parallel lines 27 (Fig. 6) are parallel with the position of the said drift rod 38, which setting is reflected in the mirror 28 at the top of the casing 26. The airplane in taking off will then move over the ground in the direction of the vector G while actually pointing in the direction of the "air speed" vector A, and will safely pass between impedimenta X without the tendency to be blown sidewise by the cross-wind indicated by the vector W.

In landing in such a restricted areas as shown in Fig. 1, precisely the same conditions are present, the only variation being in the method of determining the orientation of the wheels 5. In this instance, the direction of the wind need not be determined as the direction of drift of the airplane can be seen by ground objects reflected in the mirror 28 of the casing 26, which ground objects are diagrammatically illustrated by the wavy lines 40 in Figs. 7 and 8. The wheels 5 are then oriented until the lines 27 in the drift indicator lie parallel with the line of the apparent passage of the ground objects indicated by the said wavy lines 40. When the wheels are so oriented, the airplane in landing will move in the direction of the vector G without hazard created by the cross wind W. An improper setting or orientation of the wheels 5 is illustrated by Fig. 7 which shows the lines crossing each other and at once suggests a further orientation of the wheels to bring the lines 27 and 40 in parallelism. In the appended claims, the wheels 5, skids or pontoons may be identified as "contact elements".

It is apparent that the drift indicator attachment may be employed as a navigation instrument while flying. For such use, the drift rod 38 is set parallel to the actual drift of the airplane, and the calibrated wind arm 33 is set parallel to the direction of the wind. These settings being established, and the stud 37 being set according to the air speed of the airplane, the position of the drift rod 38 on the said calibrated wind arm 33, will indicate on the calibration of said wind arm the actual wind speed.

In the case of small, light airplanes, it is contemplated, if desired, to dispense with the rear wheel, drag skid and drift indicator, as in some cases a pilot is able to judge whether his wheels are actually in line with the ground speed by observing the wheel itself, at least to accomplish safe landings with small planes.

Having thus fully described the invention, I do not wish to be understood as limiting myself to the exact construction herein set forth, as various changes and modifications may be made therein without departing from the spirit of this invention, and I consider myself clearly entitled to all such changes and modifications as fall within the limit and scope of the appended claims.

1. An airplane landing gear including a pair of forward contact elements, a contact element in rear of the center of gravity of the airplane, means for pivotally mounting said contact elements, means connecting said mounting means to maintain the contact elements in parallelism, manually actuating means for simultaneously orienting said contact elements on their pivotal mountings, a drift indicator connected to said manually actuating means and movable simultaneously with said contact elements, and a drift indicator attachment for indicating the extent of orientation of the said contact elements.

2. An airplane landing gear including a pair of forward contact elements, a friction contact element in rear of and closely adjacent the center of gravity of the airplane, means for pivotally mounting said contact elements, means connecting said mounting means to maintain the contact elements in parallelism, manually actuating means for simultaneously orienting said contact elements on their pivotal mountings, a drift indicator connected to said manually actuating means and movable simultaneously with said contact elements, and a drift indicator attachment for indicating the extent of orientation of the said contact elements.

3. An airplane landing gear including a pair of forward contact elements, a contact element in rear of the center of gravity of the airplane, means for pivotally mounting said contact elements, means connecting said mounting means to maintain the contact elements in parallelism, manually actuating means for simultaneously orienting said contact elements on their pivotal mountings, and a drift indicator connected to said manually actuating means and movable simultaneously with said contact elements.

4. An airplane landing gear including a pair of forward contact elements, a friction contact element in rear of and closely adjacent the center of gravity of the airplane, means for pivotally mounting said contact elements, means connecting said mounting means to maintain the contact elements in parallelism, manually actuating means for simultaneously orienting said contact elements on their pivotal mountings and a drift indicator connected to said manually actuating means and movable simultaneously with said contact elements.

5. An airplane landing gear including a pair of forward contact elements, a contact element in rear of the center of gravity of the airplane, means for pivotally mounting said contact elements, means for maintaining said contact elements in parallelism, manually actuating means for simultaneously orienting said contact elements, a drift indicator connected to said manually actuating means and movable simultaneously with said contact elements, and a drift indicator attachment for indicating the extent of orientation of said contact elements.

6. An airplane landing gear including a pair of forward contact elements, a friction contact element in rear of and closely adjacent the center of gravity of the airplane, means for pivotally mounting said contact elements, means for maintaining said contact elements in parallelism, manually actuating means for simultaneously orienting said contact elements, a drift indicator connected to said manually actuating means and movable simultaneously with said contact elements, and a drift indicator attachment for indicating the extent of orientation of said contact elements.

7. An airplane landing gear including a pair of forward contact elements, a contact element in rear of the center of gravity of the airplane, means for pivotally mounting said contact elements, means for maintaining said contact elements in parallelism, manually actuating means for simultaneously orienting said contact elements, and a drift indicator connected to said manually actuating means and movable simultaneously with said contact elements.

8. An airplane landing gear including a pair of forward contact elements, a friction contact element in rear of and closely adjacent the center of gravity of the airplane, means for pivotally mounting said contact elements, means for maintaining said contact elements in parallelism, means for simultaneously orienting said contact elements, a drift indicator movable with the contact elements, and a drift indicator attachment for indicating the extent of orientation of the contact elements.

9. An airplane landing gear including a pair of forward contact elements, a contact element in rear of the center of gravity of the airplane, means for pivotally mounting said contact elements, means for maintaining said contact elements in parallelism, means for simultaneously orienting said contact elements, a drift indicator movable with the contact elements, and a drift indicator attachment for indicating the extent of orientation of the contact elements.

10. An airplane landing gear including a pair of forward contact elements, a friction contact element in rear of and closely adjacent the center of gravity of the airplane, means for pivotally mounting said contact elements, means for maintaining said contact elements in parallelism, means for simultaneously orienting said contact elements, a drift indicator movable with the contact elements.

11. An airplane landing gear including a pair of forward contact elements, a contact element in rear of the center of gravity of the airplane, means for pivotally mounting said contact elements, means for maintaining said contact elements in parallelism, means for simultaneously orienting said contact elements, a drift indicator movable with the drift indicator.

12. An airplane landing gear having a forward contact element, a friction contact element in rear of and closely adjacent the center of gravity of the airplane, means for maintaining the contact elements in parallelism, a drift indicator movable with said contact elements, and a drift indicator attachment for indicating the extent of orientation of the contact elements.

13. An airplane landing gear having a forward contact element, a contact element in rear of the center of gravity of the airplane, means for orienting the contact elements in parallelism, a drift indicator movable with the contact elements, and a drift indicator attachment for indicating the extent of orientation of the contact elements.

14. An airplane landing gear having a forward contact element, a friction contact element in rear of and closely adjacent the center of gravity of the airplane, means for maintaining the contact elements in parallelism, a drift indicator movable with said contact elements.

15. An airplane landing gear having a forward contact element, a contact element in rear of the center of gravity of the airplane, means for orienting the contact elements in parallelism, a drift indicator movable with the contact elements.

16. An airplane landing gear including a plurality of contact elements, a drift indicator, means for simultaneously orienting the contact elements and drift indicator and means for indicating the extent of orientation of the contact elements.

17. An airplane landing gear including a plurality of contact elements, a drift indicator, and means for simultaneously orienting the contact elements and drift indicator.

18. A device of the character described including a drift indicator and contact elements, means for simultaneously orienting the drift indicator and contact elements, the said drift indicator including a transparent member having indicia thereon, a casing above the transparent member, and a reflector on said casing.

19. A device of the character described including a drift indicator having a movable transparent member with indicia thereon, a casing above the transparent member, and a drift indicator attachment for said casing for indicating the extent of movement of the transparent member.

20. In an aircraft, a landing gear having contact elements adjustable for pointing in the direction of and parallel to the drift of the craft, a rotatable ground-viewing member having a series of parallel sighting lines for alignment with the travel of ground objects sighted therethrough, means operatively connecting said member with the said contact elements for adjustment in unison therewith so that said sighting lines will at all times lie in the direction of and parallel with the landing gear elements, and means for adjusting said elements.

21. In an aircraft, a landing gear having contact elements adjustable for pointing in the direction of and parallel to the drift of the craft, a ground-viewing member rotatably mounted in the craft at a distance from the contact elements and having a series of parallel sighting lines for alignment with the travel of ground objects sighted through the member, said member being operatively connected with said contact elements for adjustment in unison therewith so that said sighting lines will at all times lie in the direction of and parallel with said elements, means for adjusting said elements, and a reflecting mirror above the said ground-viewing member and in the line of vision of the pilot.

22. A navigation instrument for aircraft comprising a horizontally disposed frame having a graduated dial and a radially disposed slot rearwardly of the dial, said slot being calibrated for air speed, a manually settable wind-direction indicating arm pivoted centrally within the dial and calibrated for wind velocity, a swivel slide on said arm, a swivel slide in said slot, and a drift-direction indicating rod slidably engaged with the said swivel slides.

23. In an aircraft, a landing gear having contact elements adjustable about vertical axes, a transparent ground-viewing member having a series of parallel sighting lines for alignment with the travel of ground objects sighted through the member, said member being operatively connected with the contact elements for adjustment in unison therewith so that the sighting lines will at all times be in the direction of and parallel with said contact elements, a casing disposed vertically over the ground-viewing member and having a horizontal slot intermediate its ends, a frame removably disposed at one end in said slot and having a transparent bottom provided exteriorly of the casing with a graduated dial and inwardly of the casing with a radially disposed slot calibrated for air speed, a wind-direction indicating arm pivoted centrally within the dial and calibrated for wind velocity, a swivel slide on said arm, a swivel slide in said slot, a drift-direction indicating rod slidably supported by the said slides, and reflecting mirror at the upper end of the casing and in the line of vision of the pilot.

24. In an airplane, the combination of an instrument for navigation including a drift-direction indicating rod movable into a position corresponding to the direction of the actual drift of the airplane, a landing gear including adjustable contact elements movable into position corresponding to the direction of the drift, and an indicator operatively connected with said contact elements for corresponding movement therewith, said indicator being positioned adjacent said drift rod for alignment therewith to indicate the correct setting of the contact elements.

In testimony whereof I affix my signature.

FRANK SHORT.